United States Patent Office.

AMOR SMITH, OF BALTIMORE, MARYLAND.

IMPROVED PROCESS FOR RENDERING RANCID ANIMAL FATS AND FOR DISINFECTING THE GASES EVOLVED.

Specification forming part of Letters Patent No. 99,253, dated January 25, 1870.

*To all whom it may concern:*

Be it known that I, AMOR SMITH, of the city and county of Baltimore, in the State of Maryland, have invented an Improved Process for Rendering Rancid Fatty Animal Matter, of which the following is a specification.

This process relates especially to the rendering of such animal fats as, being rancid or in process of decomposition, would emit offensive odors; and my improvement consists in adding to a process, as set forth in a specification filed herewith, for treating such fatty substances as are not rancid, to which reference is herein made for fuller explanation, other processes for disinfecting the gases evolved and rendering them inodorous, so that rancid fats can be rendered without creating a nuisance. The process for rendering fatty animal substances, whether rancid or not, is the same, and for a fuller comprehension thereof I refer to said specification, and another accompanied by drawings, for an improved apparatus especially designed for this purpose.

Such animal matter is placed in a close tank or digester, and subjected to a heat sufficient to crisp the cracklings introduced with a stream of air, forced in by pressure-blast, and passed through a suitable coil or other ordinary apparatus for heating it in its passage from the pressure-blast to the tank. As the gases and vapors arising from such process will be offensive in odor, it is necessary to connect with said tank a close box or receiver, into which the gases and molten product of rendering shall flow from apertures at or near the bottom of the tank, the said molten products being maintained at such a height in both the tank and receiver as to cover such apertures. The heated air, steam, and offensive gases passing from the tank will rise to the upper part of the box or receiver, and must be thence led away in a pipe or pipes, and discharged into a trough below the surface of a stream of water, where the steam and offensive gases will be condensed and carried away with the stream into a sewer or other conduit. The melted fat may be drawn from the receiver by means of a pipe opening out of the receiver below the surface of such melted fat contained therein, so that none of the offensive gases may pass into the open air with such melted product.

In other rendering processes the pressure of steam in the tank or digester, whether such steam is introduced from a boiler or generated from the water contained in the fatty substances, is employed to force the noxious gases through pipes and discharge them either into the furnaces or into chambers containing some disinfecting materials. The offensive gases are not combustible, and the odors are delivered from the stack in as offensive a form as when they entered the furnace, and their effect is only transferred to another place. The use of disinfecting materials is expensive, as they soon become saturated. A current of water is cheap, and more effective than either of the other modes. I make no use of the pressure of steam. The force which is used to carry off the gases through the discharge-pipe is derived entirely from the pressure-blast, which must afford a force at least as great as that caused by the expansion of whatever steam is generated within the tank or digester, and also what is required to carry away the gases and steam evolved.

What I claim as new, and desire to secure by Letters Patent, is—

The process for rendering rancid fatty animal matter and disinfecting the gaseous products by subjecting such materials to the action of hot air, introduced, under pressure, into a close tank, in which they are contained, and then conducting away such offensive vapors or gases as may be evolved, and discharging them below the surface of a stream of running water, substantially as set forth.

In testimony whereof I have signed my name to this specification in the presence of two subscribing witnesses.

AMOR SMITH.

Witnesses:
R. MASON,
B. EDW. J. EILS.